(12) United States Patent
Becker et al.

(10) Patent No.: US 7,707,543 B2
(45) Date of Patent: Apr. 27, 2010

(54) ARCHITECTURE FOR A COMPUTER-BASED DEVELOPMENT ENVIRONMENT WITH SELF-CONTAINED COMPONENTS AND A THREADING MODEL

(75) Inventors: Detlef Becker, Moehrendorf (DE); Karlheinz Dorn, Kalchreuth (DE); Vladyslav Ukis, Nuremberg (DE); Hans-Martin Von Stockhausen, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 1188 days.

(21) Appl. No.: 11/283,713

(22) Filed: Nov. 22, 2005

(65) Prior Publication Data

US 2006/0136921 A1 Jun. 22, 2006

Related U.S. Application Data

(60) Provisional application No. 60/630,212, filed on Nov. 24, 2004.

(30) Foreign Application Priority Data

Nov. 24, 2004 (DE) .................. 10 2004 056 732

(51) Int. Cl.
G06F 9/44 (2006.01)
G06F 9/445 (2006.01)
(52) U.S. Cl. .................. 717/104; 717/149; 717/150
(58) Field of Classification Search ......... 717/104–108, 717/120, 149–151
See application file for complete search history.

(56) References Cited

U.S. PATENT DOCUMENTS 5,175,856 A * 12/1992 Van Dyke et al. ........... 717/151
6,012,081 A * 1/2000 Dorn et al. .................. 718/102
6,266,805 B1 * 7/2001 Nwana et al. ............... 717/104
6,275,871 B1 * 8/2001 Reinfelder et al. .......... 719/328
6,539,541 B1 * 3/2003 Geva .......................... 717/150
6,952,825 B1 * 10/2005 Cockx et al. ................ 718/102
7,086,009 B2 * 8/2006 Resnick et al. .............. 715/771
7,143,401 B2 * 11/2006 Babaian et al. ............. 717/149
7,159,211 B2 * 1/2007 Jalan et al. .................. 717/149
7,191,429 B2 * 3/2007 Brassard et al. ............. 717/104
7,222,334 B2 * 5/2007 Casati et al. ................ 717/136
7,249,346 B2 * 7/2007 Cohen et al. ................ 717/108
7,320,044 B1 * 1/2008 Zandonadi et al. .......... 710/261
7,343,595 B2 * 3/2008 Iley et al. .................... 717/141
7,398,521 B2 * 7/2008 Hoflehner et al. ........... 717/151
7,401,131 B2 * 7/2008 Robertson et al. ........... 709/220
7,451,403 B1 * 11/2008 Srinivasan et al. .......... 715/763
7,493,594 B2 * 2/2009 Shenfield et al. ............ 717/107

(Continued)

OTHER PUBLICATIONS

Zahran et al, "Dynamic thread resizing for speculative multithreaded processors", IEEE, ICCD, pp. 313-318, 2003.*

(Continued)

Primary Examiner—Anil Khatri
(74) Attorney, Agent, or Firm—Harness, Dickey & Pierce, P.L.C.

(57) ABSTRACT

A method, a device and a system arrangement are disclosed for generating self-contained software components having in each case synchronous and/or asynchronous interfaces with an internal threading model. The concept disclosed enables all necessary synchronization mechanisms to be provided automatically. The concept is based on an asynchronous operation manager used to divert callbacks from a called component into a calling component.

30 Claims, 4 Drawing Sheets

U.S. PATENT DOCUMENTS 7,565,640 B2 *   7/2009   Shukla et al. ............... 717/105
7,574,690 B2 *   8/2009   Shah et al. ................. 717/104

OTHER PUBLICATIONS

Chaudhry et al, "Simultaneous speculative threading: A novel pipeliine architecture implemented in Sun's Rock processors", ACM ISCA, pp. 484-495, 2009.*

Jung et al, "Adaptive execution techniwues for SMT multiprocessor architectures", ACM PPoPP, pp. 236-246, 2005.*

Tallent et al, "Effective performance measuremets and analysis of multithreaded applications", ACM PPoPP, pp. 229-239, 2009.*

Double-checked locking: Clever, but broken (Goetz, B.), Java World, Feb. 2001, http://www.javaworld.com/javaworld/jw-02-2001/jw-0209-double_p.html) Seite 1 bis 7 2005Q21738.

Nehmer, J., "Systemsoftware: Grundlagen moderner Betriebssysteme", 1. Aufl.-Heidelberg, dpunkt-Verl., 1998, S. 216-218.

* cited by examiner

Cascading asynchronous call scenario

ARCHITECTURE FOR A COMPUTER-BASED DEVELOPMENT ENVIRONMENT WITH SELF-CONTAINED COMPONENTS AND A THREADING MODEL

The present application hereby claims priority under 35 U.S.C. §119 on German patent application number DE 10 2004 056 732.8 filed Nov. 24, 2004, and under 35 U.S.C. §119 on U.S. provisional patent application No. 60/630,212 filed Nov. 24, 2004, the entire contents of each of which are hereby incorporated herein by reference.

FIELD

The invention is generally in the field of application development, in which the development environment supports programming based on a threading model, for example.

BACKGROUND

In current mechanisms for application development, it is known to provide a development environment that enables a process to be mapped to and split between a plurality of parallel or concurrent execution paths or threads. The threading model confers the advantage that existing resources can be better utilized and that the computer time required for the process can be reduced.

If, for example, the process or part of the process entails transferring extensive medical image data from an input device to an image processing computer and performing inputs via a user interface with reference to said image data (e.g. captioning the images), then these are two fundamentally different tasks—on the one hand the data transmission and on the other hand the user input—which without a threading model can only be executed sequentially.

Consequently, the user input can only be performed once the entire data transmission process has been completed. This often results in unacceptable waiting times for the user. If, on the other hand, the threading model is used, it is possible for the user input to be performed already during the time in which the data is being transmitted, so that the two processes can be nested and/or executed in parallel in two different threads.

In general, a threading architecture requires increased programming effort however, among other things because hitherto it has been virtually impossible with the known methods from the prior art to exchange a subcomponent of a component containing a thread and replace it with another subcomponent. The previous procedure was highly inflexible in this respect.

Moreover, application development with multiple threads requires skilled software developers who know how to avoid classic threading anomalies. In application development systems to date, there has hitherto been no support nor a guided procedure with which the developer is provided with support in relation to the aforesaid problem areas.

If a threading model is used, among other things, the following problems must be taken into account:
  it must be possible to generate and delete the respective threads or process sequences,
  a synchronization of the access to and from different threads and
  an assignment of computer resources for concurrent threads is necessary, and
  communication mechanisms between threads must also be provided.

If only one of the abovementioned problem areas is incorrectly or inadequately addressed during development with threads, the entire software project can fail.

Support for the application developer when using the threading model is hitherto unknown. On the contrary, it is necessary for developers to provide their own mechanisms for avoiding access errors, in particular ones based on an incorrect synchronization of the accesses to data of the different threads.

FIG. 1 shows the procedure for systems from the prior art which, although they provide for a plurality of threads, do not offer any automatic support for handling reciprocal accesses.

In principle, a plurality of parallel executing threads may be provided. Several components may run in one thread. From a component of one thread, it is possible to call a further component of another thread. The result of the call is usually solved via a callback from the called component to the calling component. The processing of such a callback from a called component to a calling component has hitherto been performed in the called component. This procedure made it necessary for application developers to manually generate new mechanisms for handling concurrent accesses to data of different threads for every process in each case.

SUMMARY

An object of at least one embodiment of the present invention is therefore to disclose a way in which an automatic synchronization of the accesses to data in a process with a plurality of threads is possible, and with which it is possible to select one component from a multiplicity of fundamentally possible components for a process at runtime and/or to replace an existing component with another component during the runtime of the process.

An object may be achieved in particular by a method of at least one embodiment for providing and linking an architecture for a software- and/or hardware-based process, which in turn is based on a threading model or can be split over a plurality of parallel executing threads respectively, and in which at least one unit to be protected is defined which must be protected against concurrent accesses from a plurality of threads, and that the unit to be protected is protected by synchronizing concurrent accesses to the unit to be protected.

In at least one an example embodiment of the invention, the areas of software code to be protected are defined automatically, once a basic framework with a processing and call structure has been defined. The protection of the areas may also be performed automatically. In an alternative embodiment, the method steps may be designed to be performed manually or user-controlled via a user interface.

The synchronization according to at least one an example embodiment of the invention, is achieved in that in each case an access of a calling thread to data of a called thread is performed directly, and/or in that a reciprocal access of the called thread to data of the calling thread is performed indirectly via an asynchronous operation manager and is diverted into an access within the calling thread.

The reciprocal access is a callback from the called thread to the calling thread with the return of the result of the called thread. According to at least one an example embodiment of the invention, the reciprocal access or the callback is performed via the asynchronous operation manager, which is intended to divert the reciprocal access into a call within the calling thread.

The process is typically an application development process, so that the development engineer is supported when programming with multiple threads. For this a menu-controlled interface is automatically generated on a user interface which requests the user to input and to define the necessary parameters. As a result, it is possible to automatically create and execute the basic framework, and consequently the repetitive routine work, during software- and/or hardware-based process development.

A key advantage of the method according to at least one an example embodiment of the invention is the fact that it is independent of the contents of the respective application or process, and therefore, in addition to application development processes, all other software- and/or hardware-based processes can be used.

Typically, a plurality of components run in one thread. The components may in turn include subcomponents, with each component and/or each subcomponent being designed in such a way that access to objects of another thread is possible. In systems to date, in some cases, it was difficult to ensure that valid data was actually accessed during an access, and not the interim results of other threads. In contrast, with the procedure according to at least one an example embodiment of the invention it is possible to automatically ensure that the respective valid data is used for processes that work with a plurality of threads that access the same data in some cases. This avoids threading anomalies resulting from the use of inconsistent data records.

With the solution according to at least one an example embodiment of the invention, it is possible to split a process into any number of threads and consequently achieve maximum parallelization, while at the same time ensuring the necessary protection against the use of inconsistent data records.

In at least one an example embodiment, the method is based on the use of passive and exchangeable subcomponents that do not themselves execute any active callback accesses per se. If it is necessary for a subcomponent to execute a reciprocal access, that is to say a callback into the calling component, then said callback is diverted via the asynchronous operation manager so that the callback is routed as a call within the calling component. Alternatively or cumulatively, it may be provided that all subordinate subcomponents of a called thread are always designed to be passive and therefore do not execute any independent callbacks, only callbacks that are diverted via an operation manager in order to be processed on the next higher level in each case.

In at least one an example embodiment, the access to data of another thread is performed from the component and/or from the subcomponent of the (calling) thread. It is however possible to provide further objects in a thread which can execute a call, and consequently a data access.

Depending on the particular application, it is sensible to split the process over more than two threads, so that it is necessary to manage a multiplicity of threads. It is then possible for a second component of a second thread to be called from a first component of a first thread, with the second component of the second thread in turn calling a third component of a third thread. The call scenario is therefore nested in cascaded form. According to at least one an example embodiment of the invention, the cascade-nested method calls are also automatically checked for data consistency and managed.

The method can consequently be used recursively for components on different hierarchical call levels. In an example scenario outlined above, the call of the first component of the first thread is therefore the highest hierarchical call level, and the last element in the call chain (the third component of the third thread in the above example) is the lowest hierarchical call level. According to at least one an example embodiment of the invention, the respective asynchronous callbacks are diverted and automatically managed.

In at least one an example embodiment, the access and/or the reciprocal access—and consequently the callback from a called thread—is performed automatically. In addition, this embodiment provides for the accesses to be managed automatically. The development engineer is supported by a wizard during the generation of the respective threads, the respective components and subcomponents and the necessary accesses. If the development engineer has defined the accesses of a thread to data of another thread on an abstract level, the accesses and the corresponding reciprocal accesses are managed automatically. This makes it possible to avoid errors that arise in particular in complex call systems when the accesses are not adequately synchronized, for example because a buffered thread is using data records that are no longer valid.

In at least one an example embodiment, the processing of the respective reciprocal access is performed on a higher hierarchical level. In particular, a callback of a component of a called thread is processed in the higher hierarchical component of the calling thread. In an advantageous refinement of at least one an example embodiment of the invention, the processing of the reciprocal accesses is executed in a central instance and is also managed there.

The method may advantageously be provided with a provider strategy which enables an implementation of a subcomponent to be selected also at the runtime of the process. If the developer wishes to define multiple instances of a subcomponent at the time of development, according to at least one an example embodiment of the invention, he can do so (but is not forced to do so). The various versions or implementations of similar subcomponents are stored in a repository according to at least one an example embodiment of the invention. The repository can be accessed externally. When configuring the subcomponents, a provider strategy is then specified with which it is possible to select and define a desired implementation on the repository. This concept enables an example implementation to be selected at runtime. This can consequently increase the flexibility of the method according to at least one an example embodiment of the invention.

A key concept of at least one an example embodiment of the present invention is that the required subcomponents are exchangeable in each case. It is consequently very easy to change and expand the process by replacing one component with another one, or adding a further subcomponent respectively.

The module or device according to at least one an example embodiment of the invention has access to all components and indirectly to all subcomponents of the system. It is essential that the interface of the module is not the same as the interfaces of the respective subcomponents. The interface of the module is an abstraction of the interfaces of the respective subcomponents. The interface of the module is on a higher, more abstract hierarchical level. The user is consequently no longer dependent on the interface of the individual subcomponents. This feature according to at least one an example embodiment of the invention can be used to ensure that individual subcomponents can be extended and exchanged at will.

The embodiments of the method according to at least one an example embodiment of the invention described above can also be designed as a computer program product, with a medium that can be read by a computer and with a computer program and associated program code segments, wherein after loading the computer program, the computer is caused to execute the method according to at least one an example embodiment of the invention described above.

An alternative solution provides for a storage medium which is intended to store the computer-implemented method described above and can be read by a computer.

BRIEF DESCRIPTION OF THE DRAWINGS

Example embodiments, which are not to be understood as restrictive, with their features and further advantages are discussed with reference to the drawings in the following detailed description of the figures. In the drawings.

DETAILED DESCRIPTION OF THE EXAMPLE EMBODIMENTS

Figure 1:
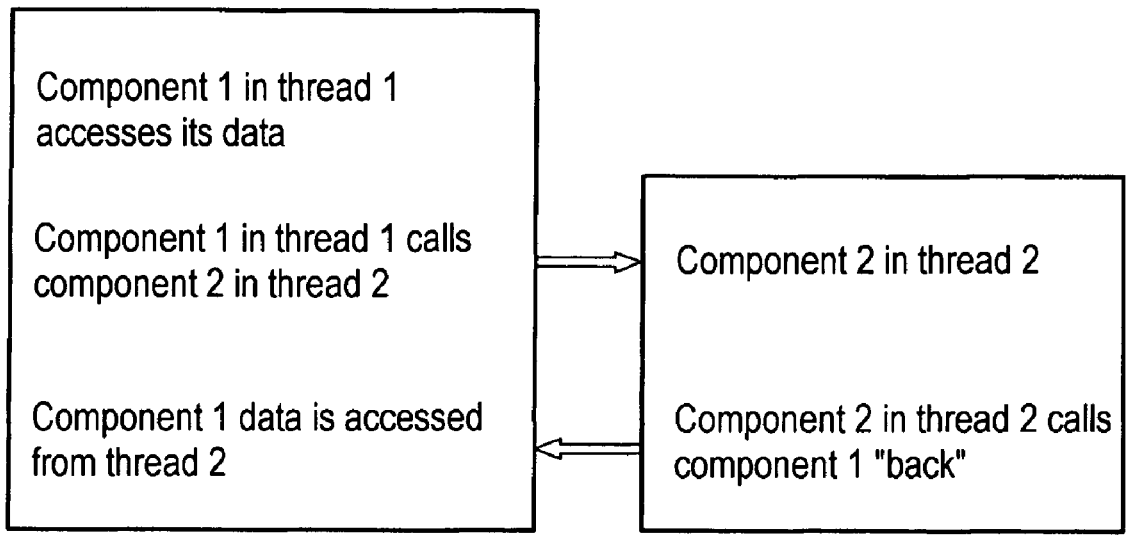
FIG. 1 shows an overview representation of a threading model in a system from the prior art.
Figure 2:
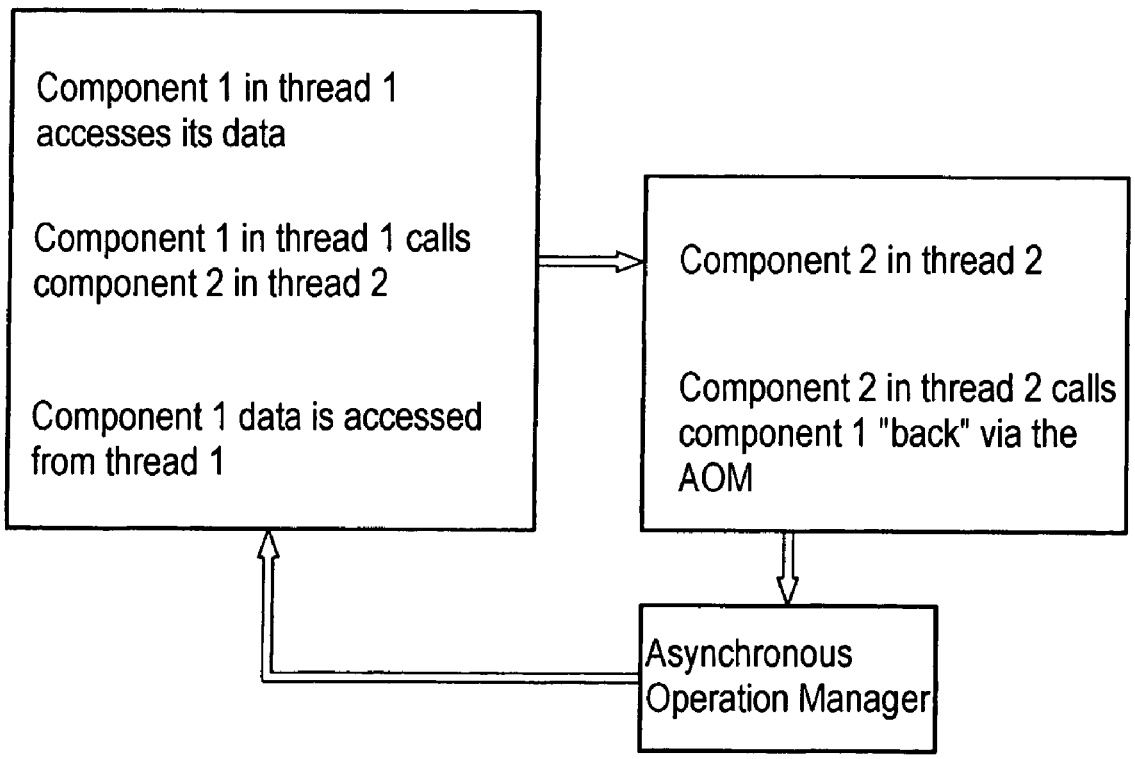
FIG. 2 shows an overview representation of a threading model in accordance with an example embodiment of the present invention.

In contrast to the threading model of known systems which has already been discussed in connection with FIG. 1 in the general description, the threading model of at least one an example embodiment of the invention includes an asynchronous operation manager 14 as shown in FIG. 2.

An application process is split over a plurality of threads. The threads can be executed in parallel. The individual threads are here solitary processes that can be interrupted by an operating system if necessary. A plurality of components 10 can run in one thread. With the threading model of the solution according to the invention, it is provided that a component 10 in a first thread can generate a second thread and can access a subcomponent 12 there for example.

A component 10 can thus include one or more subcomponents 12.

As illustrated in FIG. 2, the essential difference between the threading model according to at least one an example embodiment of the invention and the threading model of systems to date is that a reciprocal access, that is to say a callback from a called component of a called thread, is no longer performed directly, but rather is implemented via the asynchronous operation manager 14. The use of the asynchronous operation manager 14 makes it possible to route callbacks from various threads back into the respective calling thread.

As a consequence, through the structure and through the architecture of the software to be generated, areas to be protected are automatically defined in advance. These areas are characterized by the fact that they are also visible to at least one other thread. They are therefore all areas in which concurrent accesses of different threads are fundamentally possible. Following the definition of the areas to be protected, these areas are automatically protected, without the developer having to make special provisions for this manually.

The module according to at least one an example embodiment of the invention includes a multiplicity of subcomponents 12 which are intended to execute subfunctions of the module in each case. The subcomponents 12 used can be exchanged by a simple change in the configuration of the module. The interfaces of the subcomponents 12 are typically not externally visible. The interfaces of the respective subcomponents 12 can be implemented by a plurality of subcomponents 12. By way of a provider strategy, this makes it also possible to decide at runtime which implementation is to be used for a particular interface. The different implementations are stored in each case in a repository provided for this purpose.

Figure 3:
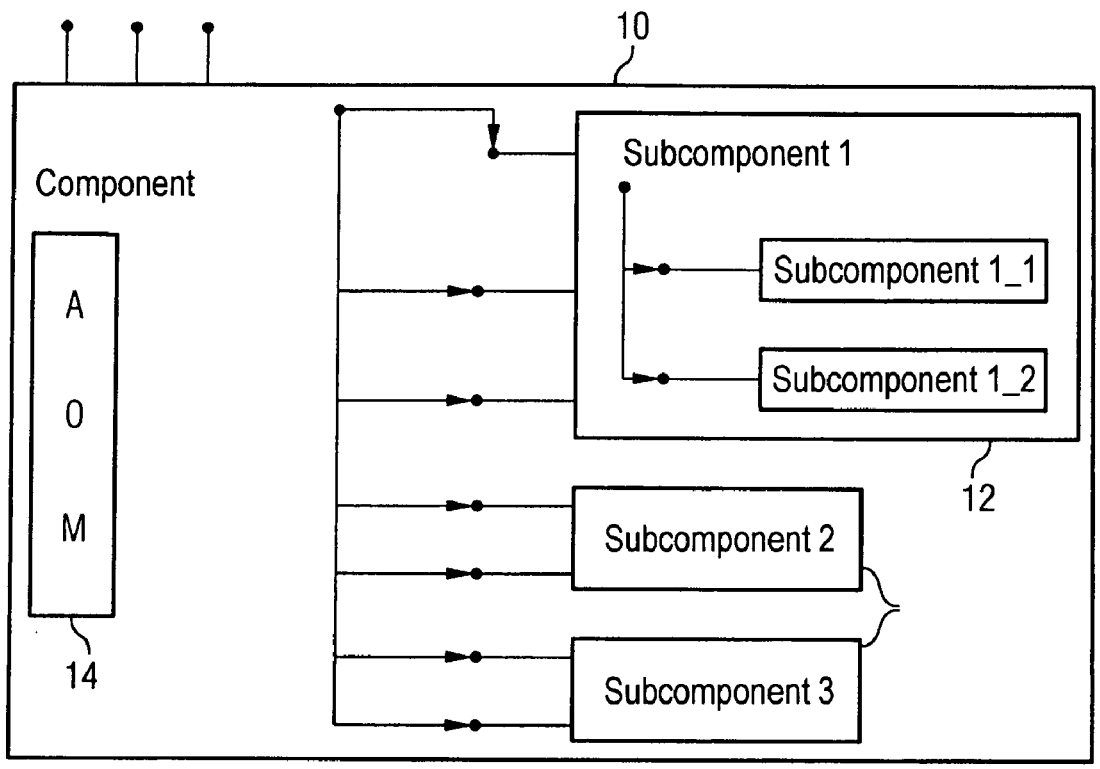
FIG. 3 shows an overview representation of a structure with key modules in accordance with an example embodiment of the invention.

FIG. 3 shows that a component 10 can include a multiplicity of subcomponents 12, wherein the subcomponents 12 in each case can recursively contain other subcomponents 12. The accesses to areas to be protected within the module, or within the generated software code respectively, are managed by way of the asynchronous operation manager 14. The module itself has access to the subcomponents 12 that are located on the highest hierarchical level. A subcomponent can in turn include other subcomponents 12, so that a cascaded hierarchy of subcomponents 12 is formed.

It is essential that the interface of the module itself is completely independent of the interfaces of the subcomponents 12. The interface of the module represents so to speak an abstraction of all interfaces of the subcomponents 12 used in each case. A key advantage of this concept is that the user is not dependent on the respective interface of the subcomponent 12, and that the subcomponents 12 can also be exchanged at runtime. For a particular interface, the user can therefore select at runtime what content said interface is to have. A preset content or preset semantics for the respective interface is preferably offered by default. The user is however free to select another implementation.

Figure 4:
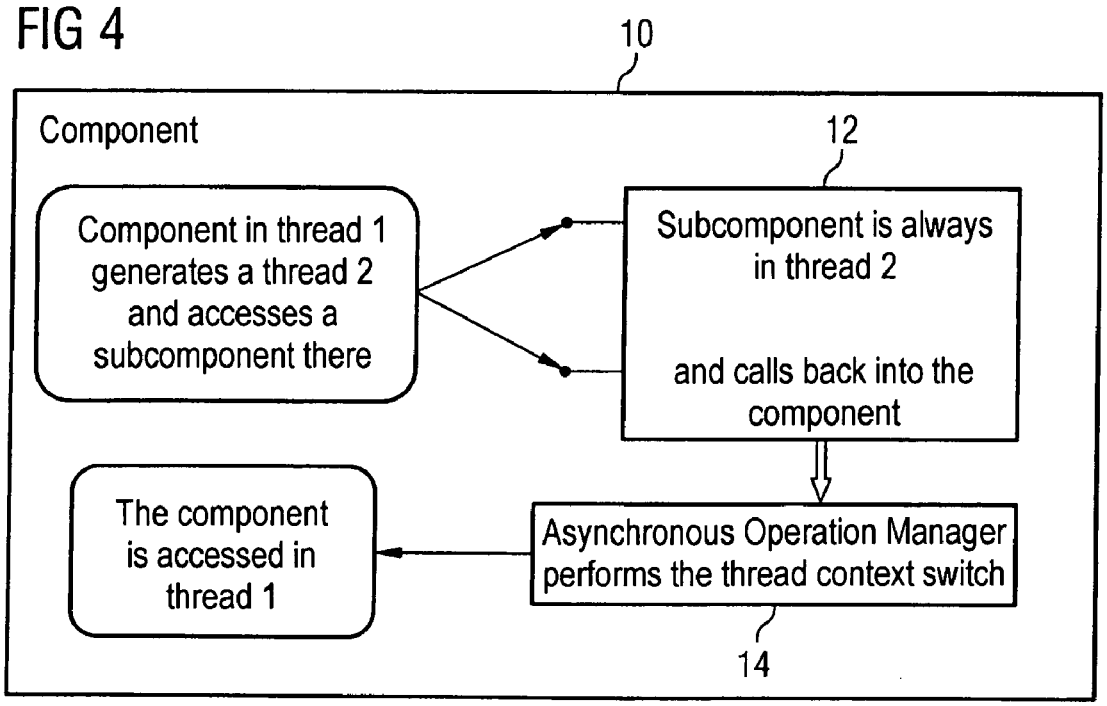
FIG. 4 shows an overview representation of the threading model in accordance with an example embodiment of the invention.

FIG. 4 shows that a subcomponent 12 is always called from the same thread. The callbacks are diverted via the asynchronous operation manager 14 into the next higher instance. This ensures that subcomponents 12 can be readily exchanged and without further adaptations in other modules. They are purely passive and do not need to have their own synchronization mechanisms.

According to at least one an example embodiment of the invention, a provider strategy is provided for the subcomponents 12 so that a simultaneous and multiple use of different instances of subcomponents 12 is possible. According to at least one an example embodiment of the invention, a repository in which all instances for the respective subcomponents 12 are stored is provided. The repository can be accessed externally. When configuring the subcomponents 12, a provider strategy is additionally specified which can be used to select an instance of a subcomponent 12. With this concept, it is possible to provide multiple implementations of an interface and to select one of them at runtime.

In at least one an example embodiment of the invention, a wizard is provided to assist the user with the creation of the module. During the application development process, the developer preferably uses said wizard to construct the basic framework of the application process.

Figure 7:
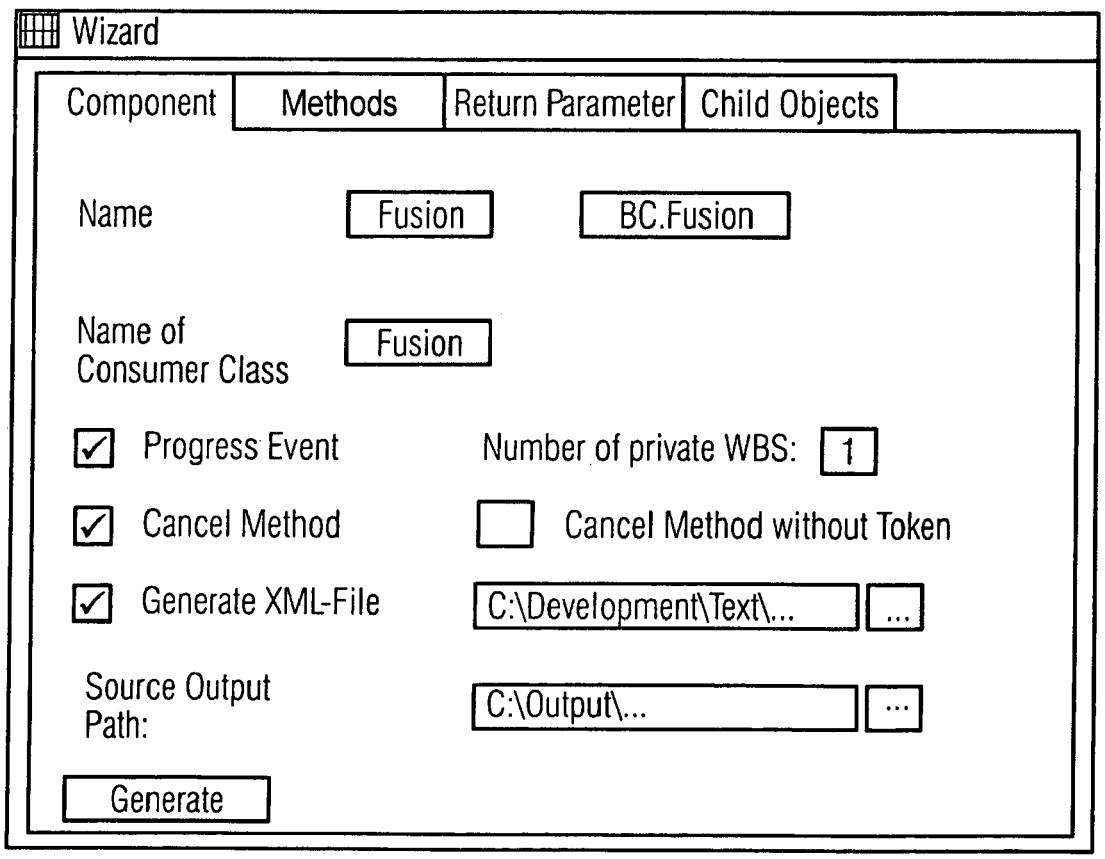
FIG. 7 shows a screen interface in accordance with an example embodiment of the invention.

FIG. 7 shows by way of example a user interface and therefore an interface for the module. The wizard serves to automatically generate software code that serves as the basic framework for the application process. The user is guided during the input and definition of specific parameters by way of predetermined dialog boxes. The automated procedure confers the advantage that errors resulting from erroneous inputs can be avoided.

FIG. 7 shows by way of example that, in addition to specifying the name and the output path, the user can also specify further settings.

The interface of the module is preferably organized in such a way that it includes methods and properties. The methods may be synchronous and/or asynchronous here. In particular it is possible to define on the interface provided whether progress events and cancel methods are to be used for asynchronous calls. With these specifications, it is possible to terminate asynchronous calls or observe their progress.

It is possible to specify the interface of the module itself in the "Methods" folder of the wizard. Here it is possible to specify for the respective method whether it is to be called asynchronously or synchronously. Depending on the particular application, it is sensible to select one or the other type. In one case, the execution is blocked until the result of the access is present—in the other case there is an immediate return and a type of placeholder is used for processing. It is provided in the preferred embodiment that both types can be ticked, so that both a synchronous and an asynchronous feature is available.

Figure 5:
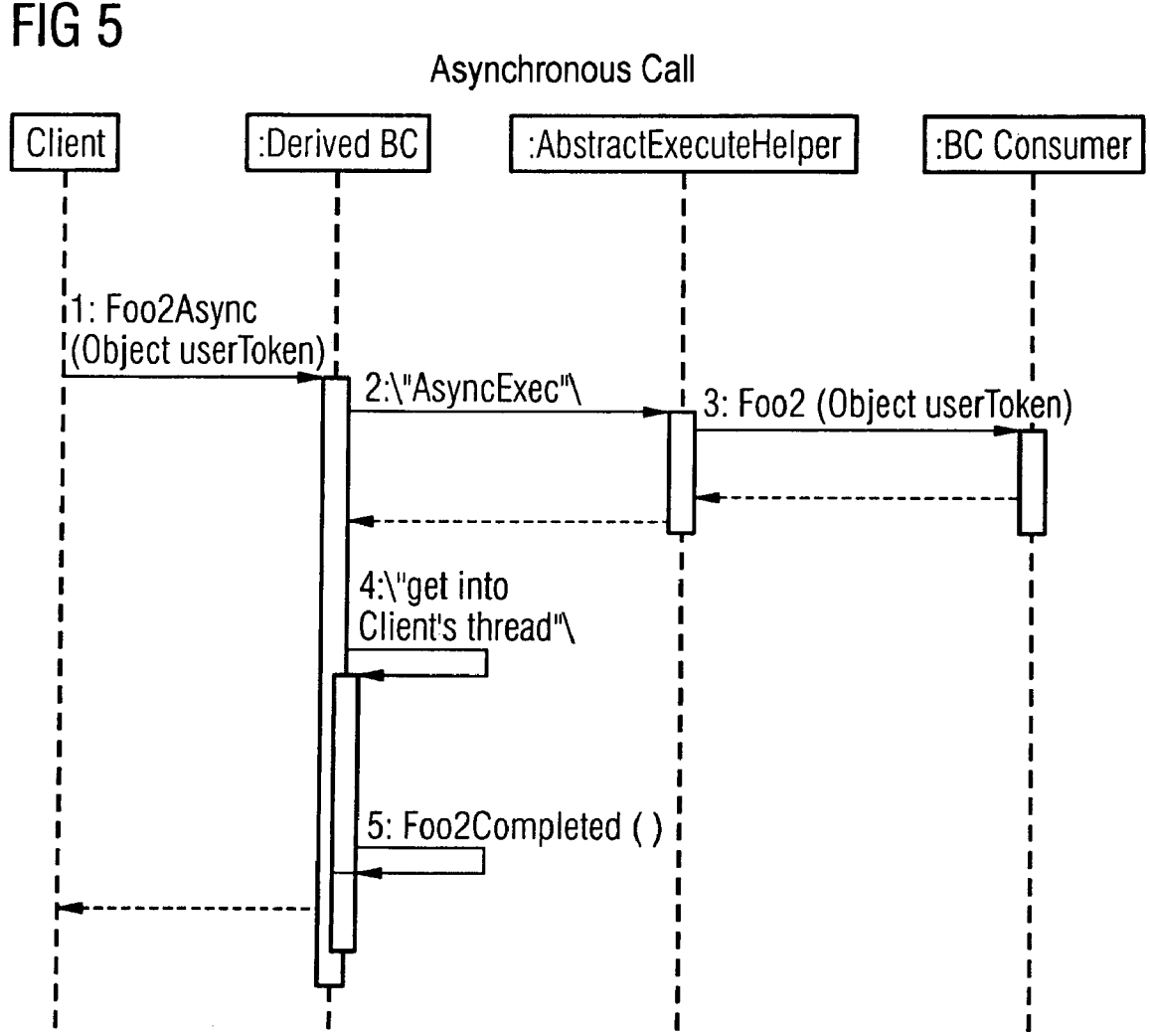
FIG. 5 shows a UML diagram for an asynchronous call according to an example embodiment the invention.

FIG. 5 shows a UML diagram (UML=unified modeling language) with an asynchronous call. The subcomponent 12 shown on the right-hand side is called asynchronously by a module.

Figure 6:
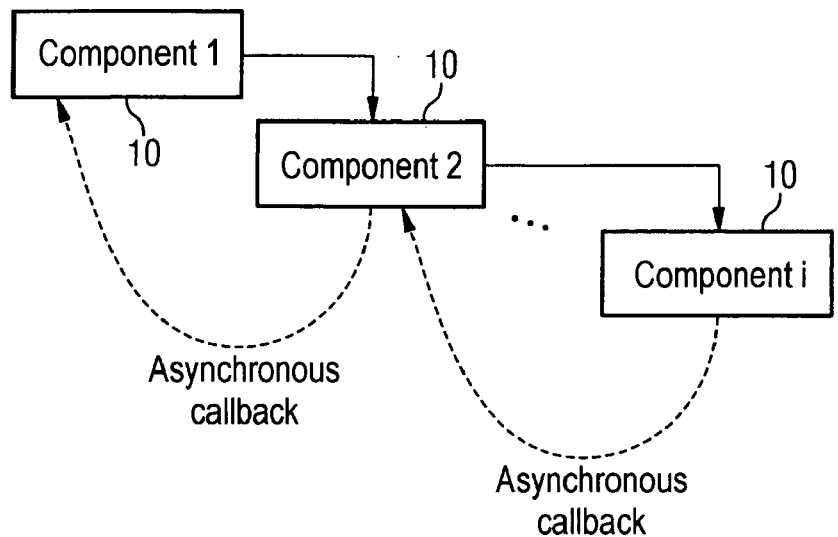
FIG. 6 shows an overview representation of a cascading asynchronous call scenario.

FIG. 6 shows a cascaded asynchronous call of a module in other components 10 in each case. In principle, the components 10 may be business components or service components. The difference between the two aforesaid types of components is simply that the contents of the service components are of a service character, for example are oriented toward a database or a transfer service. The business components can implement general functionalities. A repository is created for the respective components. It is also provided that the components can call each other.

Every component 10 can be furnished with an internal thread, so that asynchronous calls can be processed. As shown in FIG. 6, the call of a calling component to a called component is performed directly. This is indicated in FIG. 6 by the solid arrow from component 1 to component 2 and component i. According to at least one an example embodiment of the invention, the callback from the respective called component 10 is performed via the asynchronous operation manager and is processed in each case on the next higher hierarchical level. This is indicated in FIG. 6 by the dashed arrows from one component 10 to the respective next higher component 10.

A key advantage of the method according to at least one an example embodiment of the invention is the version independence of the service components 10. By virtue of the concept according to at least one an example embodiment of the invention, it is possible for different versions of a service component 10 to be provided. The user can load a particular selected version of a service component 10 at runtime. For this it is necessary to specify the respective name and version in the configuration.

It is provided that an interface of a service component 10 in one version always also supports all previous versions of the interface. Thus, in principle only one interface of a service component 10 can ever be extended. In at least one an example embodiment of the invention, it is preset that the latest version of the respective interface is always instanced. This is achieved via a preset selection in the user interface according to at least one an example embodiment of the invention, the wizard. Alternatively, however, it is equally possible to select a particular version manually.

By virtue of the solution according to at least one an example embodiment of the invention, it is possible to provide active components 10 that include passive subcomponents 12 or business objects. Owing to their passive character, the subcomponents 12 are readily exchangeable.

According to at least one an example embodiment of the invention, the threading model of a respective component 10 is defined so that the user does not need to provide synchronization mechanisms.

A key advantage of the method according to at least one an example embodiment of the invention is that the user is supported by an automatic code generator. The interface of the module for the user is formed by the wizard. The wizard automatically generates a framework-like software code with the respective components 10. The synchronization mechanisms for the respective components 10 used or for the subcomponents 12 used are already defined. The user need only implement the predefined framework for the specific application.

A key advantage of the solution according to at least one an example embodiment of the invention is the great flexibility of the system. A component 10 can be readily extended simply by adding further subcomponents 12. In addition, it is possible to select different implementations of an interface at runtime. This makes it possible, for example, to process different image types at runtime with different post-processing algorithms.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for providing an architecture for at least one of a software based and hardware-based process, the process being dividable over a at least one of plurality of components and over a plurality of parallel executing threads, comprising:

automatically defining at least one unit to be protected which must be protected against concurrent accesses from a plurality of threads;

synchronizing concurrent accesses to the at least one unit to be protected to thereby automatically protect the at least one unit to be protected; and automatic generating of at least one of software code for the process for the subcomponents with their interfaces and of a repository with at least one of the components and subcomponents required in each case, wherein the synchronizing includes, directly performing an access of a calling thread to data of a called thread, and indirectly performing a reciprocal access of the called thread to data of the calling thread and diverting it into an access within the calling thread, and the performing performs the reciprocal access of the called thread to data of the calling thread on a higher hierarchical level in each case.

2. The method as claimed in claim 1, wherein a plurality of components are run in one thread, which components in turn include subcomponents, and wherein each subcomponent is always called by the same thread.

3. The method as claimed in claim 1, wherein at least one of the components and subcomponents of a called thread are passive and do not themselves execute any direct reciprocal accesses.

4. The method as claimed in claim 1, wherein the access is performed from at least one of a component and a subcomponent.

5. The method as claimed in claim 1, wherein the method is version-independent.

6. The method as claimed in claim 1, wherein the method is used recursively for components on different hierarchical call levels.

7. The method as claimed in claim 1, wherein the method includes a provider strategy which enables an exchange of an implementation of a subcomponent at runtime.

8. The method as claimed in claim 7, wherein a component is also extendable at runtime by adding at least one further subcomponent.

9. The method as claimed in claim 1, wherein the subcomponents are at least one of self-contained modules and exchangeable at runtime.

10. The method as claimed in claim 1, wherein a type is selectable for the interface of the component, and wherein a choice between a synchronous and an asynchronous interface is selectable.

11. The method as claimed in claim 1, wherein a plurality of components are run in one thread, which components in turn include subcomponents, and wherein each subcomponent is always called by the same thread.

12. The method as claimed in claim 1, wherein at least one of the components and subcomponents of a called thread are passive and do not themselves execute any direct reciprocal accesses.

13. The method as claimed in claim 1, wherein the access is performed from at least one of a component and a subcomponent.

14. The method as claimed in claim 1, wherein the method is not dependent on one version of a component.

15. A computer program, adapted to, when executed on a computer, cause the computer to carry out the method as claimed in claim 1.

16. A computer program product, including the computer program of claim 15.

17. A computer readable storage medium including program segments for, when executed on a computer, causing the computer to implement the method of claim 1.

18. A device for providing an architecture for at least one of a software-based and hardware-based process, the process being dividable over at least one of plurality of components and over a plurality of parallel executing threads, the device comprising:

at least one definition unit to define units to be protected as units that need to be protected against concurrent accesses from a plurality of threads;

at least one asynchronous operation manager to automatically protect the units to be protected by synchronizing concurrent accesses to units to be protected; and a code generator for the automatic generation of at least one of software code for the process for the subcomponents with their interfaces and of a repository with at least one of the components and subcomponents required in each case, wherein the asynchronous operation manager synchronizes the concurrent accesses to the units to be protected by directly performing an access of a calling thread to data of a called thread, and by indirectly performing a reciprocal access of the called thread to data of the calling thread via the asynchronous operation manager and diverting it into an access within the calling thread, and the asynchronous operation manager performs the reciprocal access of the called thread to data of the calling thread on a higher hierarchical level in each case.

19. The device as claimed in claim 18, wherein a plurality of components run in one thread, which components in turn include subcomponents, and wherein each subcomponent is always called by the same thread.

20. The device as claimed in claim 18, wherein at least one of the components and subcomponents of a called thread are passive and do not themselves execute any direct reciprocal accesses.

21. The device as claimed in claim 18, wherein the access is performed from at least one of a component and a subcomponent.

22. The device as claimed in claim 18, wherein the device is version-independent.

23. The device as claimed in claim 18, wherein the device includes a device nested within it.

24. The device as claimed in claim 18, wherein the device includes a provider which is intended to enable a selection and an exchange of an implementation of a subcomponent at runtime.

25. The device as claimed in claim 24, wherein a component also is extendable at runtime by adding at least one further subcomponent.

26. The device as claimed in claim 24, wherein the subcomponents are at least one of self-contained modules and exchangeable at runtime.

27. The device as claimed in claim 18, wherein a type is selectable for the interface of the component, and wherein a choice between a synchronous and an asynchronous interface is selectable.

28. The device as claimed in claim 18, wherein a plurality of components run in one thread, which components in turn include subcomponents, and wherein each subcomponent is always called by the same thread.

29. The device as claimed in claim 18, wherein the device is not dependent on one version of a component.

30. A system arrangement for providing an architecture for at least one of a software-based and hardware-based process, the process the process being dividable over at least one of plurality of components and over a plurality of parallel executing threads, the system arrangement comprising:

at least one component to execute at least some of the functionality of the process and has a selectable interface;

at least one definition unit to define units to be protected as units that need to be protected against concurrent accesses from a plurality of threads;

at least one asynchronous operation manager to automatically protect the units to be protected by synchronizing concurrent accesses to units to be protected; and/or a code generator for the automatic generation of at least one of software code for the process for the subcomponents with their interfaces and of a repository with at least one of the components and subcomponents required in each case, wherein the asynchronous operation manager synchronizes the concurrent accesses to the units to be protected by directly performing an access of a calling thread to data of a called thread, and by indirectly performing a reciprocal access of the called thread to data of the calling thread via the asynchronous operation manager and diverting it into an access within the calling thread, and the asynchronous operation manager performs the reciprocal access of the called thread to data of the calling thread on a higher hierarchical level in each case.

* * * * *